UNITED STATES PATENT OFFICE.

HAZIME FUKUDA, OF ARMINTO, WYOMING.

PROCESS OF MAKING RICE BREAKFAST FOOD.

1,266,448.   Specification of Letters Patent.   Patented May 14, 1918.

No Drawing.   Application filed August 17, 1917.   Serial No. 186,815.

*To all whom it may concern:*

Be it known that I, HAZIME FUKUDA, a subject of the Emperor of Japan, residing at Arminto, in the county of Natrona and State of Wyoming, have invented certain new and useful Improvements in Processes of Making Rice Breakfast Food, of which the following is a specification.

This invention relates to a process of making breakfast foods and has for its object the production of a simple and efficient process for producing a palatable breakfast food from rice seed.

Another object of this invention is the production of a simple and efficient process whereby the rice seed may be easily and conveniently treated for softening the kernels of the rice seed and preparing the same for consumption.

Other objects and advantages of the present process will appear throughout the following specification and claim.

In carrying out the process involved in the present invention, a suitable quantity of rice seed is placed in water and allowed to soak for a period of approximately thirty-six hours. The rice seed is then removed from the water and is subjected to heat, such as artificial heat or the rays of the sun, until the moisture has evaporated from the shells of the rice seed. The rice seed is then placed within a popcorn popper and the popper is then held over a suitable heating medium until the rice has "popped."

It will be seen that by carrying out the above process the grains or kernels of the rice will be efficiently treated whereby the shell of the rice kernel will be broken open after the kernels have first been thoroughly soaked in water, as above stated, thereby thoroughly softening the interior of the rice kernel.

After the rice has been prepared as above described, it may be cooked for the purpose of producing a mush similar to the manner in which mush is made from corn meal and the like.

The rice after it has been prepared as above described may also be eaten in the same manner as is common with corn flakes and the like, by subjecting the popped rice to a suitable amount of heat and then soaking the rice in milk.

It should be further understood that the rice may also be used after having been treated by means of the process above outlined for making candy and the like.

What is claimed is:—

A process for producing popped rice which consists in soaking a given quantity of rice seed in water for approximately thirty-six hours until the rice seed has become thoroughly softened, then removing the rice seed from the water and subjecting the same to a suitable amount of heat until the moisture has been evaporated from the shell of the rice, and then placing the rice in a popper and subjecting the rice to a suitable amount of heat to cause the same to pop.

In testimony whereof I hereunto affix my signature.

HAZIME FUKUDA.